(12) United States Patent
Wan et al.

(10) Patent No.: US 7,704,484 B2
(45) Date of Patent: Apr. 27, 2010

(54) METHOD FOR PRODUCING HYDROGEN BY USING DIFFERENT METALS

(75) Inventors: Jin-Ten Wan, Taipei Hsien (TW); Tsang-Lin Hsu, Taipei Hsien (TW); Heng-I Lin, Taipei Hsien (TW)

(73) Assignee: Liung Feng Industrial Co., Ltd., Taipei Hsien (TW)

( * ) Notice: Subject to any disclaimer, the term of this patent is extended or adjusted under 35 U.S.C. 154(b) by 0 days.

(21) Appl. No.: 12/003,688

(22) Filed: Dec. 31, 2007

(65) Prior Publication Data
US 2008/0292540 A1 Nov. 27, 2008

(30) Foreign Application Priority Data
May 24, 2007 (TW) ............................... 96118619 A

(51) Int. Cl.
*C01B 3/02* (2006.01)
*C01B 3/08* (2006.01)
*C25C 3/20* (2006.01)
*B23H 3/00* (2006.01)
*B23H 5/00* (2006.01)

(52) U.S. Cl. .................... 423/648.1; 423/657; 423/658; 205/375; 205/707; 205/708

(58) Field of Classification Search .............. 423/648.1, 423/657, 658; 205/375, 707, 708; 204/196.23; 361/509; *C01B 3/02, 3/08*
See application file for complete search history.

(56) References Cited

U.S. PATENT DOCUMENTS

| | | | | |
|---|---|---|---|---|
| 5,554,457 A | * | 9/1996 | Bugga et al. ................. | 429/102 |
| 6,527,924 B1 | * | 3/2003 | Andolfatto et al. ...... | 204/290.01 |
| 2002/0192153 A1 | * | 12/2002 | Yasuda et al. ................ | 423/644 |
| 2004/0020790 A1 | * | 2/2004 | Waite et al. .................. | 205/710 |
| 2004/0096742 A1 | * | 5/2004 | Akashi et al. ................ | 429/223 |
| 2008/0069767 A1 | * | 3/2008 | Wan et al. .................... | 423/657 |

OTHER PUBLICATIONS

Pierre R. Roberge "Corrosion Engineering: Principles and Practice". McGraw-Hill; Publication Date: Mar. 30, 2008; ISBN-10-0071482431.*

* cited by examiner

*Primary Examiner*—Roy King
*Assistant Examiner*—Alexander Polyansky
(74) *Attorney, Agent, or Firm*—Rosenberg, Klein & Lee

(57) ABSTRACT

A method for producing hydrogen by using different metals includes: providing a metal of lower reduction potential as an anode metal and a metal of higher reduction potential as a cathode metal, then immerse the anode metal and the cathode metal in an electrolyte, while the anode metal and the cathode metal can be combined with appropriate steps before or after being immersed in the electrolyte, whereby hydrogen and side-products generated from a reaction of electrochemistry caused by reduction potential difference between the different metals, that is, the method for producing hydrogen is through spontaneous chemical reaction without extra energy consumption.

15 Claims, 11 Drawing Sheets

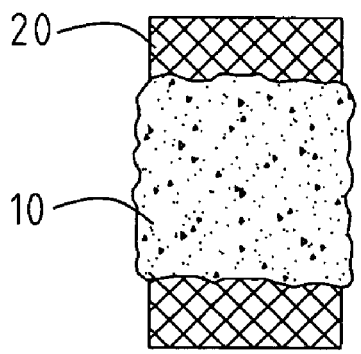
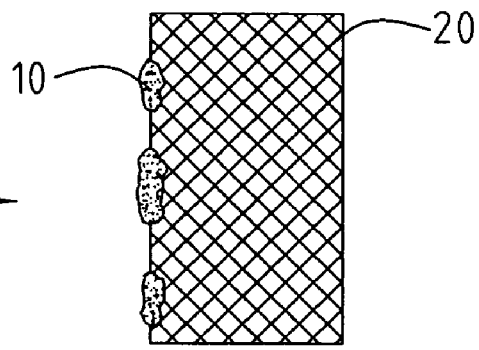
FIG.3A  →  FIG.3B
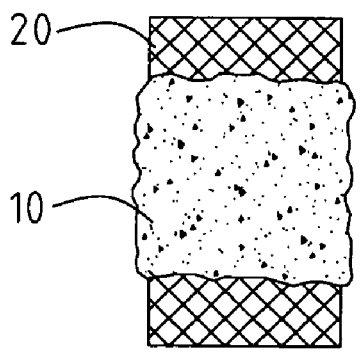
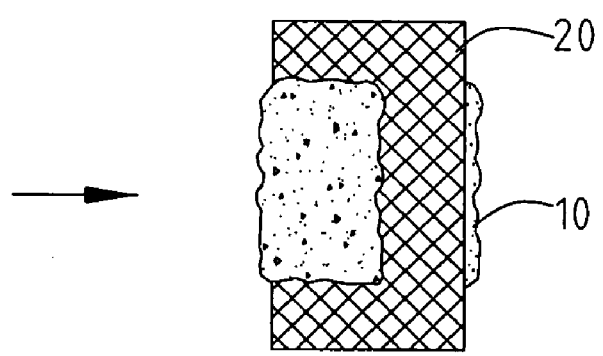
FIG.4A  →  FIG.4B
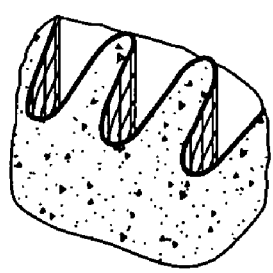
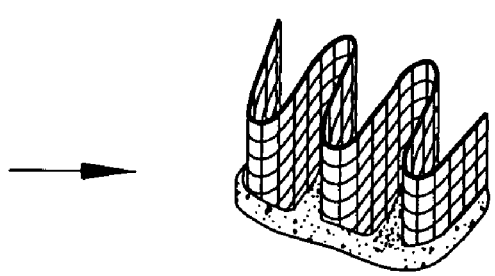
FIG.5A  →  FIG.5B

METHOD FOR PRODUCING HYDROGEN BY USING DIFFERENT METALS

BACKGROUND OF THE INVENTION

1. Field of the Invention

The present invention relates to a method for producing hydrogen, and particularly to a method for producing hydrogen by using different metals through spontaneous chemical reaction and a reaction of electrochemistry caused without extra energy consumption.

2. Related Art

Hydrogen is a non-pollution resource, which can be adapted to fuel, Ni-MH battery, and energy for industrials, such as desulfuration materials for oil working, chemical industrial, metallurgy industrial, and semi-conductor industry. Besides, hydrogen reacted in fuel cells do not produce carbon dioxide, therefore, hydrogen is expected to be new resource of energy in the development of the fuel cells. It is no doubt that increasing research on hydrogen is inevitable in the near future. Thus the study of application of hydrogen is very important.

As is well known, there are many ways to produce hydrogen, such as steam reforming, partial oxidation, gasification, and producing by electrolyte solution; however, hydrogen produced by the preceding three ways will generated carbon dioxide as well, which is unnecessary and not benefit to our earth, especially that carbon dioxide is the main factor causing global warming. Unfortunately, the fourth way mentioned before requires a large electricity consumption during processes of hydrogen production, and which results in higher cost, not economic benefits.

Although aforementioned ways are not the ideal ways to produce hydrogen, there is one method of producing hydrogen that is by using metal scrap. For instance, recycle disused aluminum cans as material of hydrogen production, but it still has to wash away coating of the cans by chemical solution, which may result in wastewater pollution.

SUMMARY OF THE INVENTION

Accordingly, an object of the present invention is to provide an innovative method for producing hydrogen from reduction potential difference generated between two different metals through spontaneous chemical reaction without consuming extra energy and causing environmental pollution.

To achieve the above-mentioned objects, the method of the present invention is to provide a metal of lower reduction potential as an anode metal and a metal of higher reduction potential as a cathode metal, then immerse the anode metal and the cathode metal in an electrolyte, while the anode metal and the cathode metal can be combined with appropriate steps before or after being immersed in the electrolyte, whereby hydrogen and side-products generated from a reaction of electrochemistry caused by reduction potential difference between the different metals.

According to the above-mentioned features, magnesium alloy or aluminum alloy and so on can be used as the anode metal, and stainless steel or platinum and so on can be used as the cathode metal.

Moreover, the electrolyte can be sodium chloride solution, normal saline, or KCl solution and so on.

Another object of the present invention is that the anode metal is smashed and extruded to a certain form, then roll the cathode metal to be tightly attach on the smashed anode metal, the cathode metal being shaped as a plate, mesh, gill net, or powder. To combine the two different metals in such way can simplify processes and economize energy.

A further object of the present invention is that the anode metal is melted to be liquid status, and one surface of the cathode metal is immersed in the melting anode metal, the optimum method of immersion, to shorten a path of electron transport between the anode and cathode metals of the reaction of electrochemistry.

According to the above-mentioned features, the cathode metal can be folded to multiple parts to increase contact area with the melting anode metal. Furthermore, the cathode metal can be immersed in the melting anode metal with only middle portions thereof, whereby to expose two ends of the cathode metal out of the melting anode metal.

BRIEF DESCRIPTION OF THE DRAWINGS

FIGS. 3A and 3B to FIGS. 5A and 5B are schematic views of a second embodiment, which illustrate development of the different metals being immersed before and after;

DESCRIPTION OF THE PREFERRED EMBODIMENTS

Figure 1:
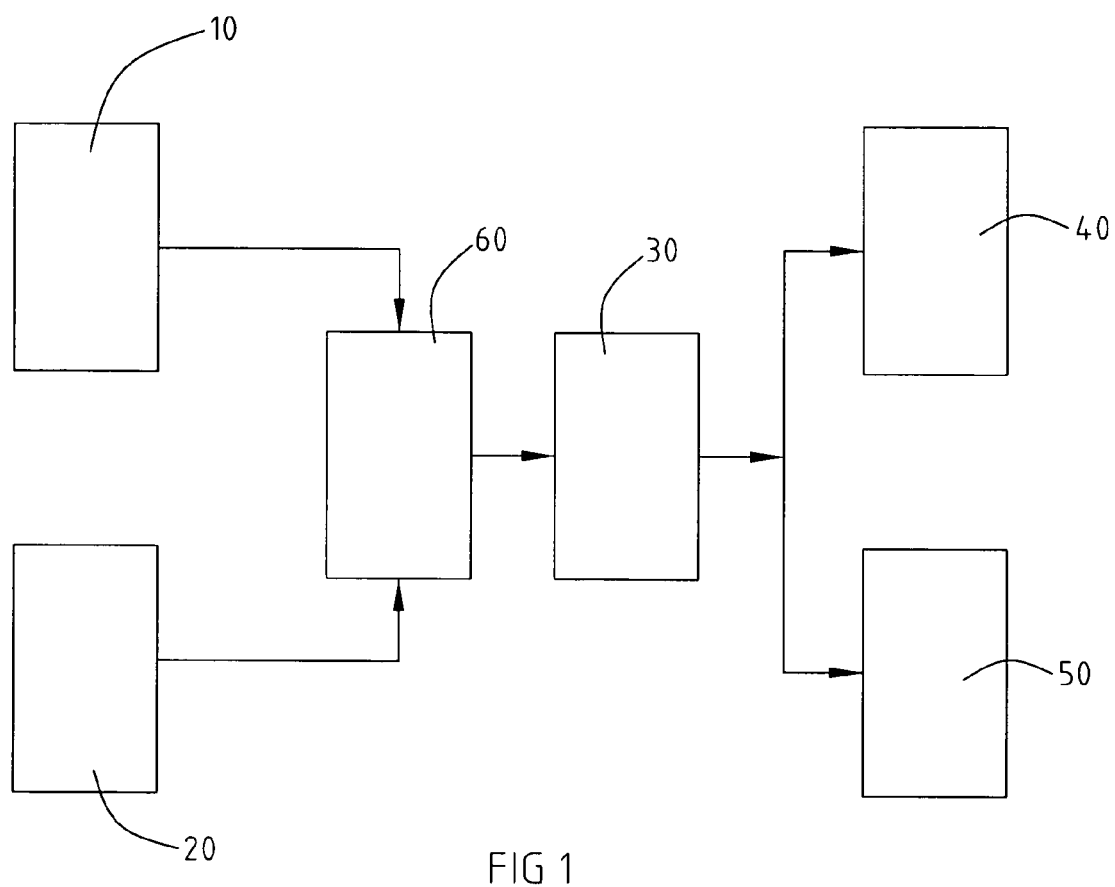
FIG. 1 is a flowchart depicting a method for producing hydrogen by using different metals of the present invention.

Illustrated in FIG. 1 is a flowchart of a method for producing hydrogen by using different metals of the present invention. The method includes: providing a metal of lower reduction potential as an anode metal 10 and a metal of higher reduction potential as a cathode metal 20, and combine the anode metal 10 and the cathode metal 20 by appropriate steps 60 (described below) and then immerse the combined metals 10, 20 in an electrolyte, whereby hydrogen 40 and side-products 50 generated from a reaction 30 of electrochemistry caused by reduction potential difference between the different metals 10, 20, wherein the anode metal 10 can be magnesium alloy scrap or aluminum alloy scrap, and the cathode metal 20 can be stainless steel or platinum and so on. In this preferred embodiment, the anode metal 10 is magnesium alloy scrap, and the cathode metal 20 is stainless steel AISI 304.

The anode metal 10 and the cathode metal 20 are combined with combining steps 60, which can be generally classified into three types. The first type is to smash and extrude the anode metal 10 to a certain form and then the cathode metal 20 is rolled to attach on the anode metal 10, the cathode metal 20 shaped as a mesh, gill net, or powder (in the preferred embodiment, the cathode is mesh-like as shown in photographs 1 to 3). The second type of the combining steps 60 is to melt the anode metal 10 to liquid status, then immerse one surface of the cathode metal 20 in the liquid anode metal 10 to achieve combination (as shown in FIGS. 3A and 3B and FIGS. 5A and 5B). The third type is that the two metals 10, 20 are being rolled together to attach to each other and kept rolling in the electrolyte.

Figure 8:
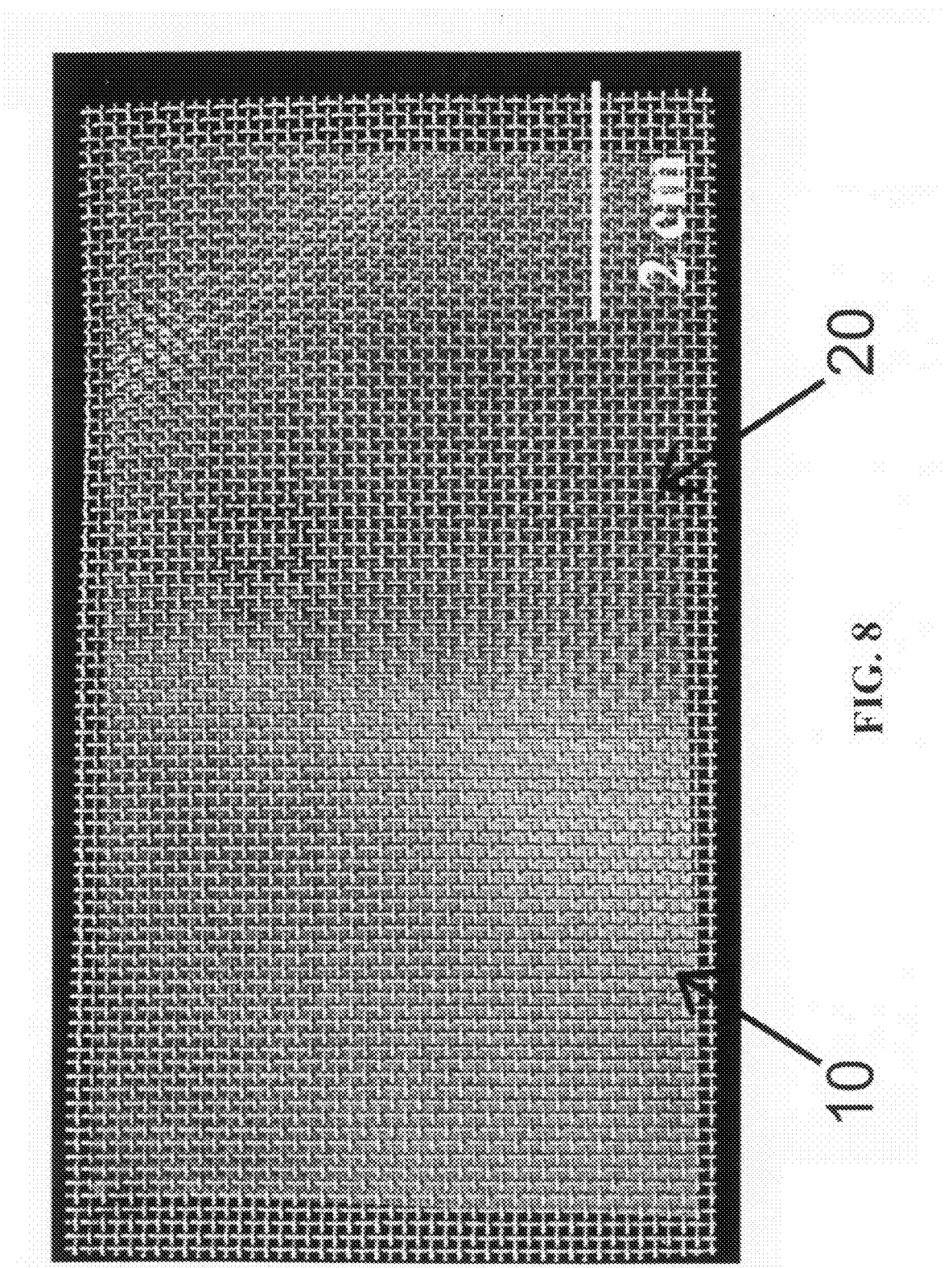
FIGS. 8-12 show development of the different metals being smashed, extruded and immersed in an electrolyte after electrochemistry reaction.
Figure 9:
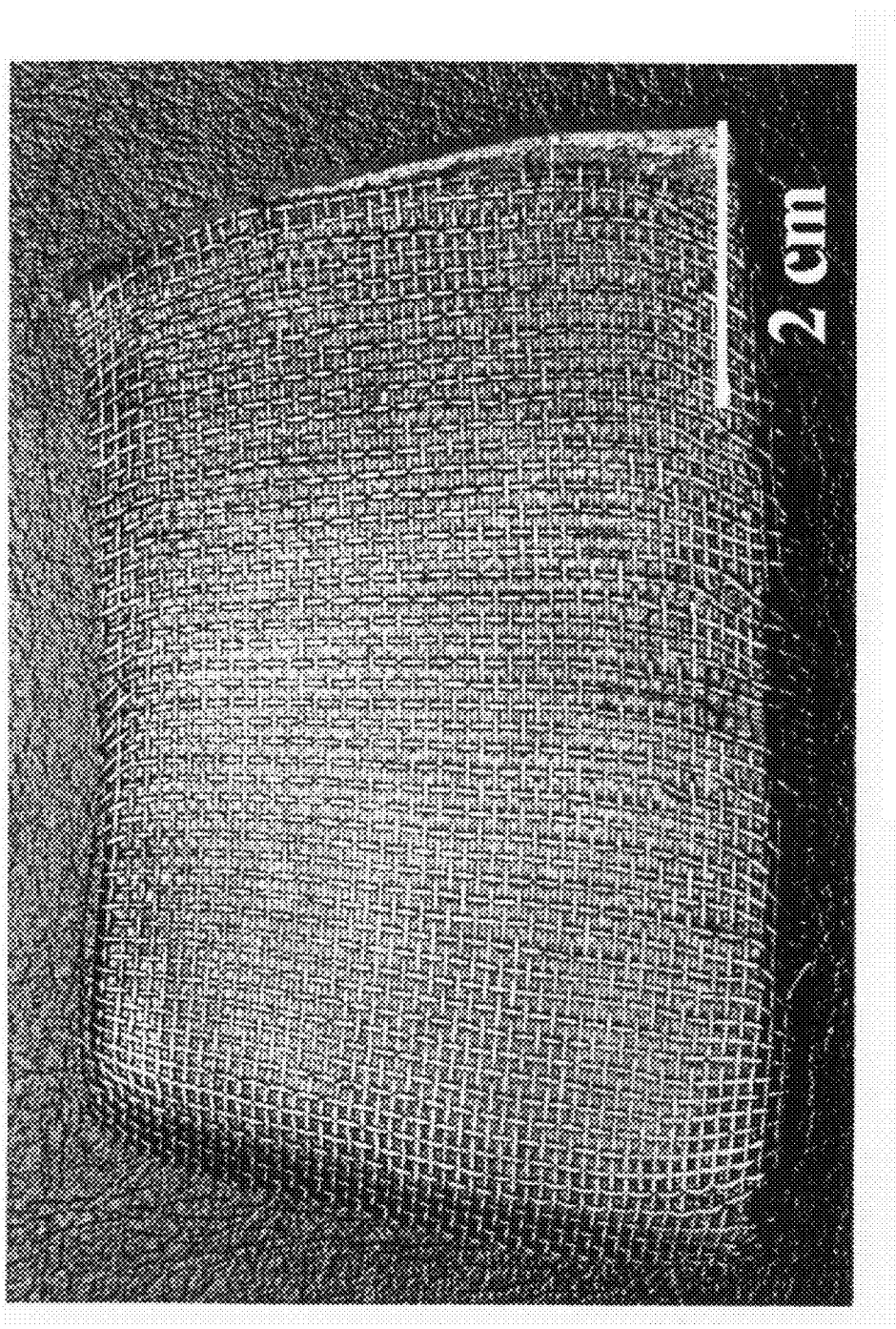
Figure 10:
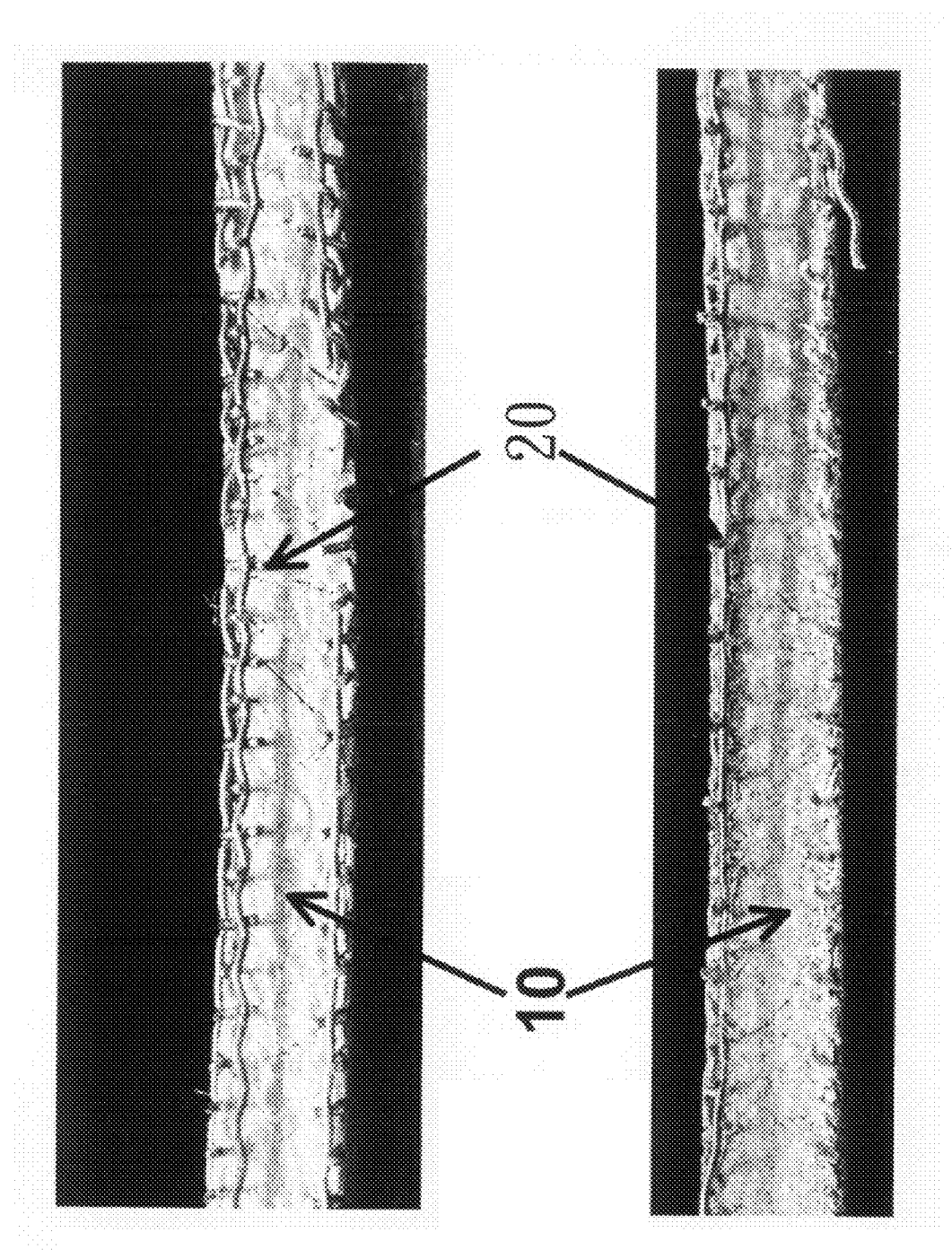
Figure 11:
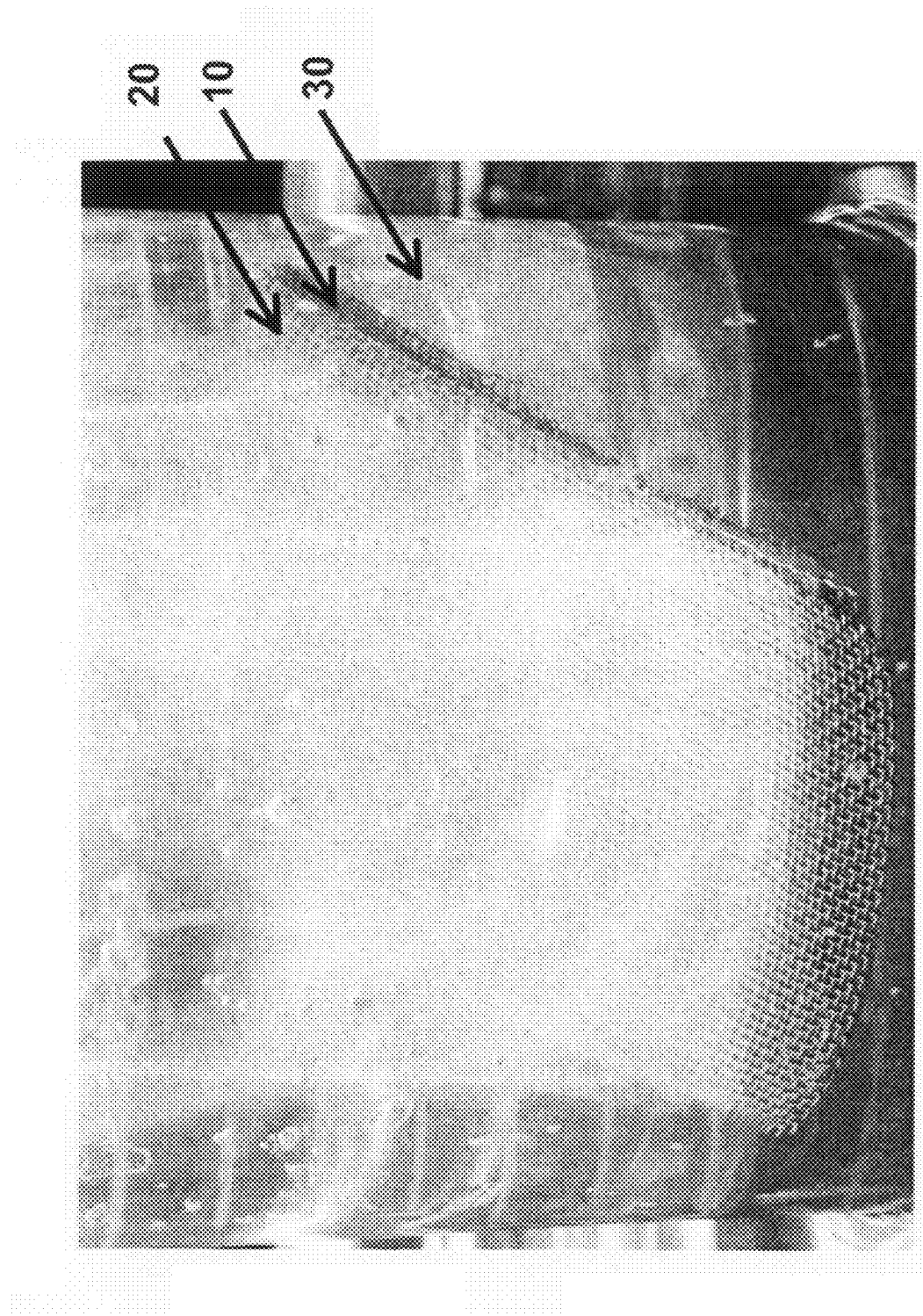
Figure 12:
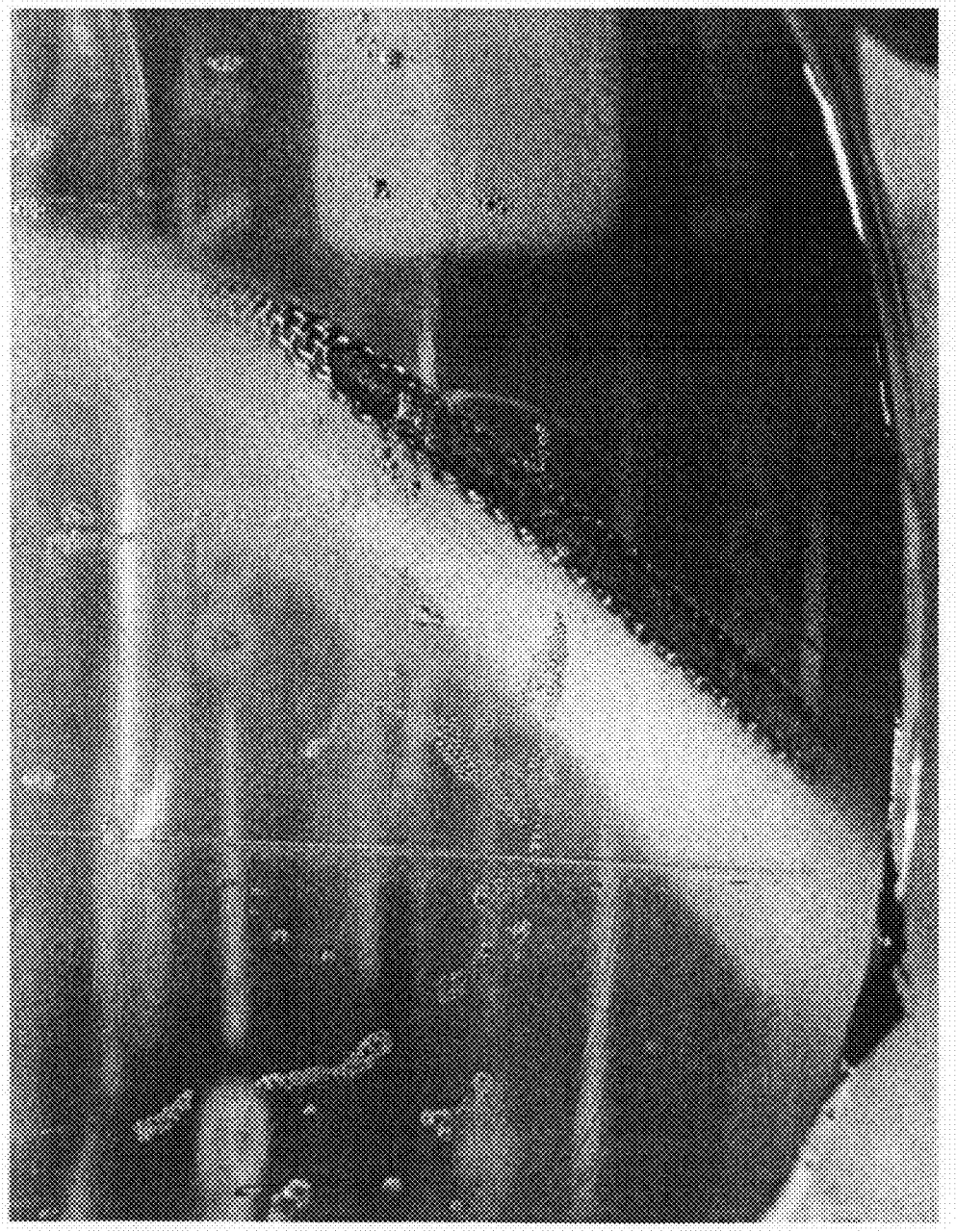

Referring to FIGS. 8 to 10 showing the first type of the combining steps 60, the combining steps 60 are described as follows: first, smash a case of magnesium alloy scrap and extrude to a certain form, then roll a stainless steel mesh (AISI 304) to be tightly attached on the magnesium alloy scrap by stamping techniques, whereby the combining steps 60 is completed. Further referring to FIGS. 11 and 12, the combined two metals 10, 20 are immersed in normal saline, which is functioned as an electrolyte, and therefore cause a reaction of electrochemistry 30. Particularly, in this embodiment, an optimum value of a mutual potential difference between the anode and the cathode metals 10, 20 is within 0.71V to 3.49V. However, in alternative selection, the stainless steel can be replaced by platinum as cathode metal and the magnesium alloy can be replaced by aluminum alloy as anode metal. The optimal value of the mutual potential difference is able to be verified by the following equation as a standard potential is hydrogen:

$$\begin{array}{cc} \text{Pt} & \text{Mg} \\ |\quad 1.118 - (-2.372)| = 3.49 \\ \text{Al} & \text{Mg} \\ |\quad -1.662 - (-2.372)| = 0.71 \end{array}$$

The optimal value of the mutual potential difference is subject to change according to the standard potential, that is, as the standard potential is calomel electrode ($Hg_2Cl_2$), the optimal value is verified by the following equation:

$$\begin{array}{cc} \text{Pt} & \text{Mg} \\ |\quad 0.28 - (-1.73)| = 2.01 \\ \text{Al} & \text{Mg} \\ |\quad -0.85 - (-1.73)| = 0.88 \end{array}$$

Namely, as calomel electrode ($Hg_2Cl_2$) is used to be the standard potential, the mutual potential difference between the anode and cathode metals is within 0.88V to 2.01V.

Moreover, the anode and cathode metals immersed in normal saline causes the reaction of electrochemistry 30, wherein the normal saline is used as the electrolyte, which can be replaced by sodium chloride solution, or KCl solution, because potassium and chlorine ions thereof do not affect $H^+$ and $OH^-$ in water. Accordingly, hydrogen 40 and side-products 50 such as hydroxide are generated from the reaction of electrochemistry 30, for which a reaction formula is as follows:

$Mg+2H_2O \rightarrow Mg(OH)_2+H_2$ 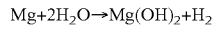

May know by the above reaction formula, after reaction, except may obtain the hydrogen gas to utilize, also may obtain side-product of the magnesium hydroxide, takes the heat-resisting product being flame-resistant raw material.

Figure 2A:
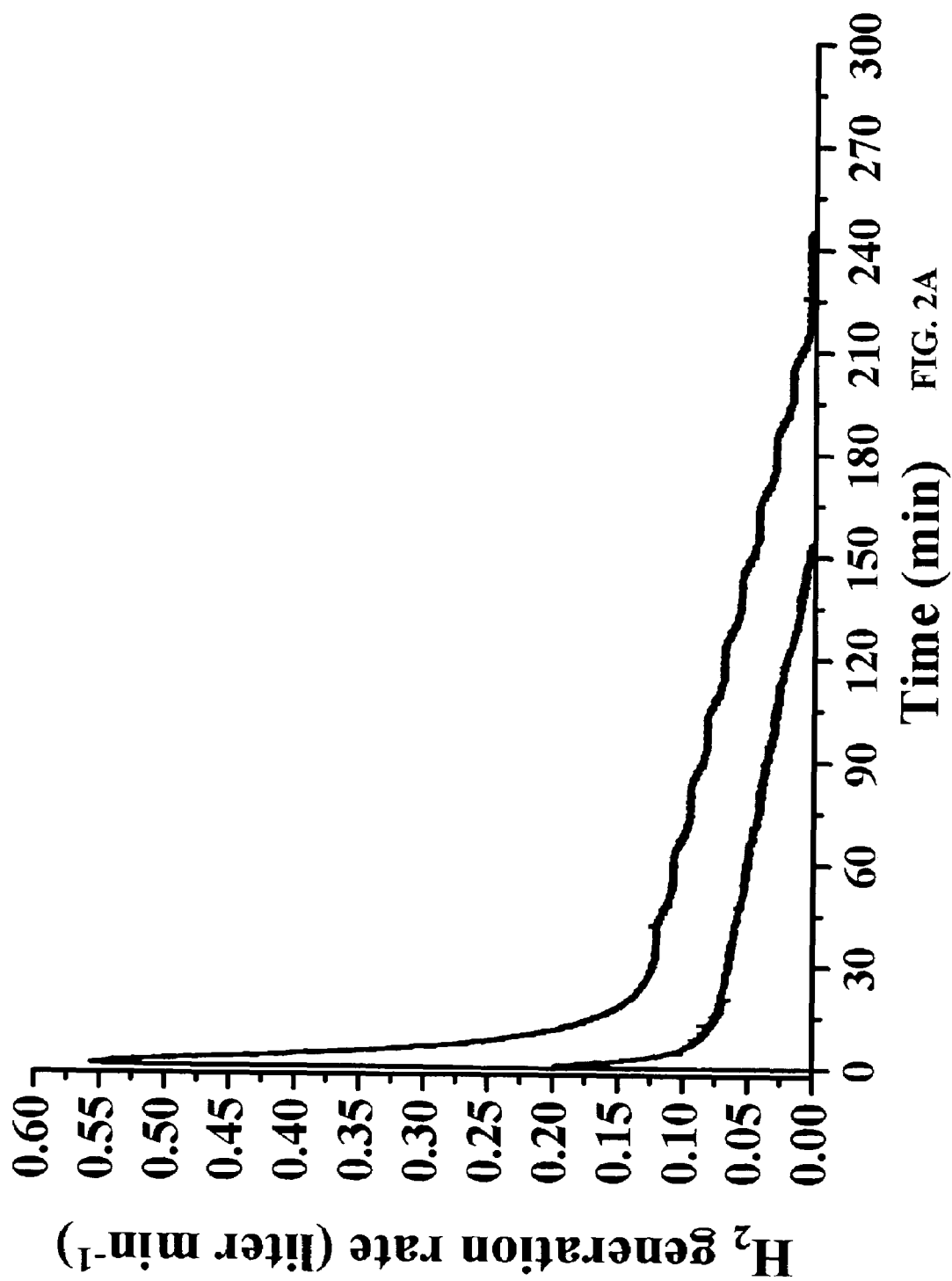
FIGS. 2A and 2B are relation diagrams respectively illustrating relation between hydrogen generation rate and time, and relation between generated hydrogen volume and time.
Figure 2B:
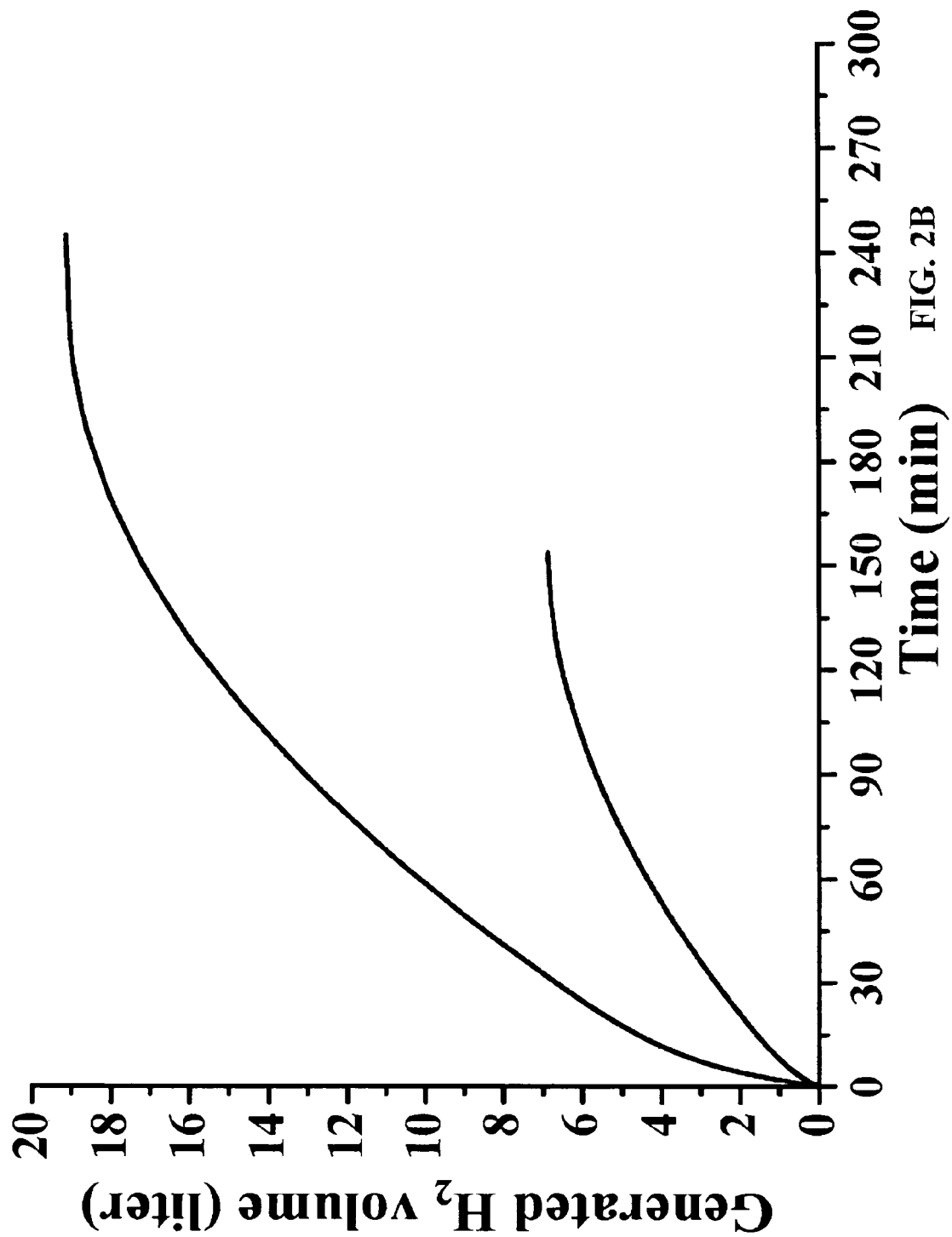

FIGS. 2A and 2B are relation diagrams respectively illustrating the relation between hydrogen generation rate and time, and the relation between generated hydrogen volume and time. It is clearly seen from FIGS. 2A and 2B that under the same conditions (with 1500 ml, 3.5 wt. % sodium chloride solution, magnesium alloy designated as an anode, stainless steel mesh (AISI 304) with size of 2×8 cm2 designated as a cathode), more pieces of the stainless steel mesh bring higher hydrogen generation rate and generated hydrogen volume. As shown in FIGS. 2A and 2B, a reaction curve representing one piece of the stainless steel mesh has lower performance than a reaction curve representing four pieces of the stainless steel mesh.

Figure 6A:
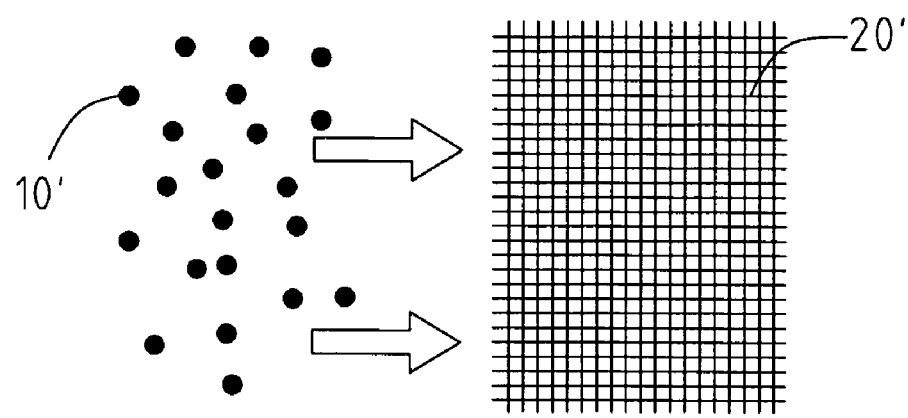
FIGS. 6A and 6B are schematic views of a third embodiment of the present invention.

With reference to FIGS. 3A and 3B to FIGS. 5A and 5B for the second type of the combining steps 60, the anode metal 10 and the cathode metal 20 can be combined by melting the magnesium alloy scrap 10 (anode metal) to liquid status, then immerse one surface of the stainless steel mesh 20 (AISI 304, cathode metal) in the melting liquid metal 10 in order to shorten a path of electron transport between the anode and cathode metals during the reaction of electrochemistry and to increase hydrogen production, as shown in FIG. 3A, the stainless steel mesh 20 being immersed with one surface only. Furthermore, the stainless steel mesh 20 is immersed with only middle parts thereof in the liquid 10, two ends of the stainless steel mesh which are exposed out of the liquid 10. Still further, the stainless steel mesh 20 can be folded to multiple parts before immersing (as shown in FIG. 5A), and then immerse middle parts of the folded stainless steel mesh 20 through which to increase contact area with the melting liquid 10. In addition to one surface immersed, two surfaces of the stainless steel mesh 20 (cathode metal) can be immersed as well. Further referring to FIG. 3B to FIG. 7B, in comparison with conventional methods of immersion (as shown in FIG. 6A), the magnesium alloy scrap 10 remains lots of area not being reacted after the reaction of electrochemistry 30, however, in contrast, in the preferred embodiment of the present invention, there is only few parts of the magnesium alloy scrap 10 not being reacted, that is, the present invention has better efficiency of hydrogen generation than conventions. (Experimental conditions are the same in the comparative experiments, i.e. 1500 ml, 3.5 wt. % sodium chloride solution, 10 pieces of stainless steel mesh (AISI 304) with size of 2×8 cm2 designated as a cathode)

Figure 2C:
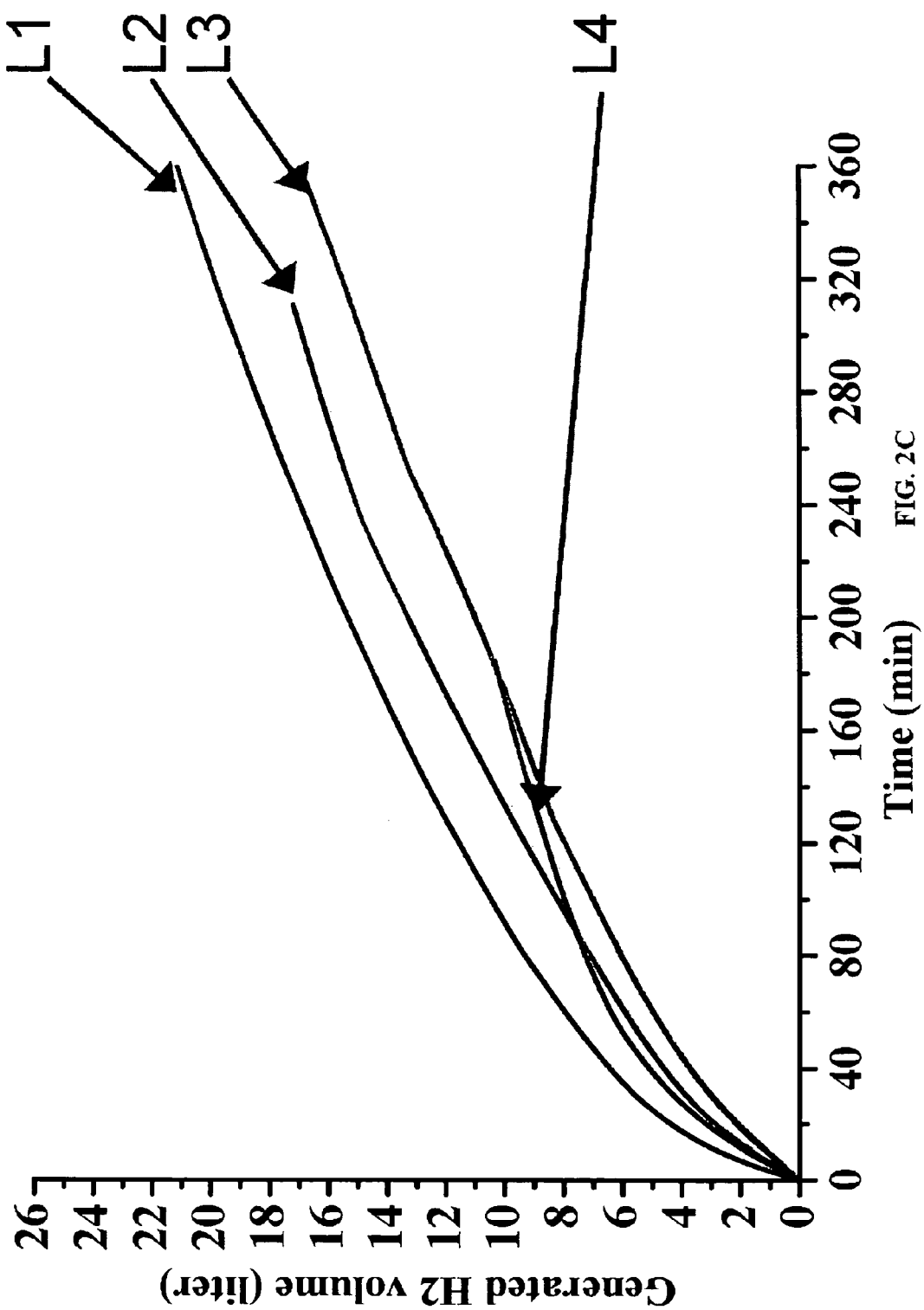
FIG. 2C is a relation diagram illustrating relation between generated hydrogen volume and time with different methods of immersion.
Figure 7A:
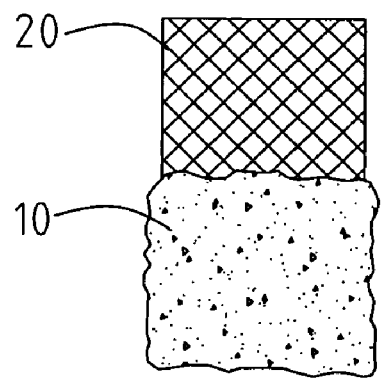
FIGS. 7A and 7B are conventional arts showing different metals combined and immersed.
Figure 7B:
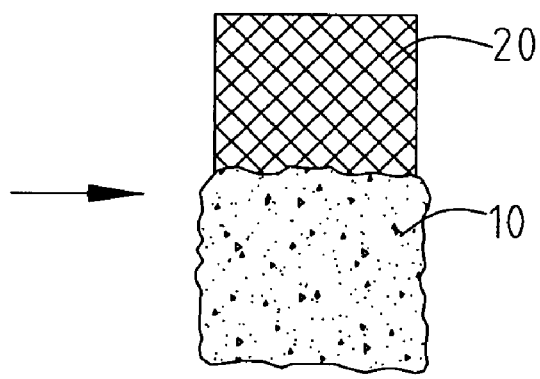

Further referring to FIG. 2C in combination with FIGS. 7A and 7B, a relation diagram illustrating relation between generated $H_2$ volume and time, in which a reaction curve L1 (representing one surface immersed), L2 (multiple folds immersed), L3 (two surfaces immersed), and L4 (conventions) respectively shows different development in different conditions. It is clearly that after sixty minutes immersion, a reaction rate of the curve L4 becomes slow, while the curves L1, L2, L3 keep rising which prove that the present invention improve efficiency of hydrogen production.

This invention this two metal union step, besides uses the above smashing extrusion to roll again the way or immerses moistens the union way, also may simultaneously carry on directly this two metals in the electrolyte the continuous rolling union, similarly may achieve causes this two metals to unify mutually the reduction potential difference between to have the electrochemistry to react, obtains the hydrogen gas and the side-products.

Figure 6B:
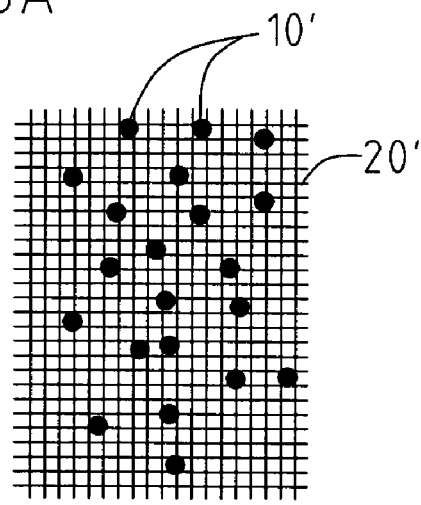

With reference to FIGS. 6A and 6B, FIGS. 6A and 6B are schematic views of a third embodiment. In the third embodiment, the combining steps 60 is to utilize the electrolyte as an intermedium to make the smashed anode metal 10' and the mesh-like cathode metal 20' contact with each other and further cause a reaction of the of electrochemistry. As shown in FIGS. 6A and 6B, the electrolyte drives the smashed anode metal 10' to contact the mesh-like cathode metal 20', or the mesh-like cathode metal 20' can be moved to contact the smashed anode metal 10' in the electrolyte Accordingly, the method of the present invention not only produces hydrogen by using magnesium alloy scrap but also produces side-product magnesium hydroxide and prevents environmental pollution.

It is understood that the present invention may be embodied in other forms without departing from the spirit thereof. Thus, the present examples and embodiments are to be considered in all respects as illustrative and not restrictive, and the invention is not to be limited to the details given herein.

What is claimed is:

1. A method for producing hydrogen by using different metals, comprising:
   providing a metal of lower reduction potential as an anode metal;
   providing a metal of higher reduction potential as a cathode metal;
   smashing and extruding the anode metal;
   rolling the cathode metal with said smashed and extruded anode metal to combine said anode metal and said cathode metal to form a composite metal; and
   immersing said composite metal in an electrolyte;
   whereby hydrogen and side-products are generated from an electrochemical reaction caused by the reduction potential difference between the different metals.

2. The method as claimed in claim 1, wherein a standard potential of the reduction potential difference between the different metals is hydrogen (H), and the cathode metal and the anode metal are defined in a range that a mutual potential difference between the two different metals is less than or equal to 3.49V.

3. The method as claimed in claim 2, wherein the mutual potential difference between the anode metal and the cathode metal is optimum within 0.71V to 3.49V.

4. The method as claimed in claim 1, wherein a standard potential of the reduction potential difference between the different metals is calomel electrode ($Hg_2Cl_2$), and the cathode metal and the anode metal are defined in a range that a mutual potential difference between the two different metals is less than or equal to 2.01V.

5. The method as claimed in claim 4, wherein the mutual potential difference between the anode metal and the cathode metal is optimum within 0.88V to 2.01V.

6. The method as claimed in claim 1, wherein the anode metal is one of magnesium alloy or aluminum alloy.

7. The method as claimed in claim 1, wherein the cathode metal is one of stainless steel or platinum.

8. The method as claimed in claim 7, wherein the electrolyte is one of sodium chloride solution, normal saline, or KCl solution.

9. The method as claimed in claim 1, wherein the cathode metal is shaped as a plate, mesh, gill net, or powder and is rolled to attach to said smashed and extruded anode metal.

10. A method for producing hydrogen by using different metals, comprising:
    providing at least two different metals respectively designated as an anode and a cathode;
    smashing and extruding the anode metal;
    immersing said two metals in an electrolyte;
    rolling said smashed and extruded anode metal and said cathode metal in the presence of said electrolyte to combine said two metals to form a composite metal;
    whereby the smashed and extruded anode metal and the cathode metal are made to be in physical contact with each other in said electrolyte and;
    whereby hydrogen and side-products are generated from a reaction of electrochemistry caused by reduction potential difference between the two different metals.

11. The method as claimed in claim 10, wherein the anode metal is of lower reduction potential and the cathode metal is of higher reduction potential.

12. The method as claimed in claim 10, wherein the cathode metal is moved to contact the smashed and extruded anode metal in the electrolyte.

13. The method as claimed in claim 10, wherein the cathode metal is shaped as a plate, mesh, and gill net.

14. A method for producing hydrogen by using different metals, comprising:
    providing a metal of lower reduction potential as an anode metal;
    providing a metal of higher reduction potential as a cathode metal;
    melting the anode metal;
    folding said cathode metal;
    dipping said cathode metal into said melted anode metal to combine said melted anode metal and said cathode metal to form a composite metal; and
    immersing said composite metal in an electrolyte;
    whereby hydrogen and side-products are generated from an electrochemical reaction caused by the reduction potential difference between the different metals.

15. The method as claimed in claim 14, wherein only either a top surface or a bottom surface of the cathode metal is dipped into said melted anode metal.

* * * * *